219-121
SEARCH ROOM
March 10, 1959 R. E. BERGE 2,877,338
METHOD OF ADJUSTING THE OPERATING FREQUENCY
OF SEALED PIEZOELECTRIC CRYSTALS
Filed Oct. 22, 1954
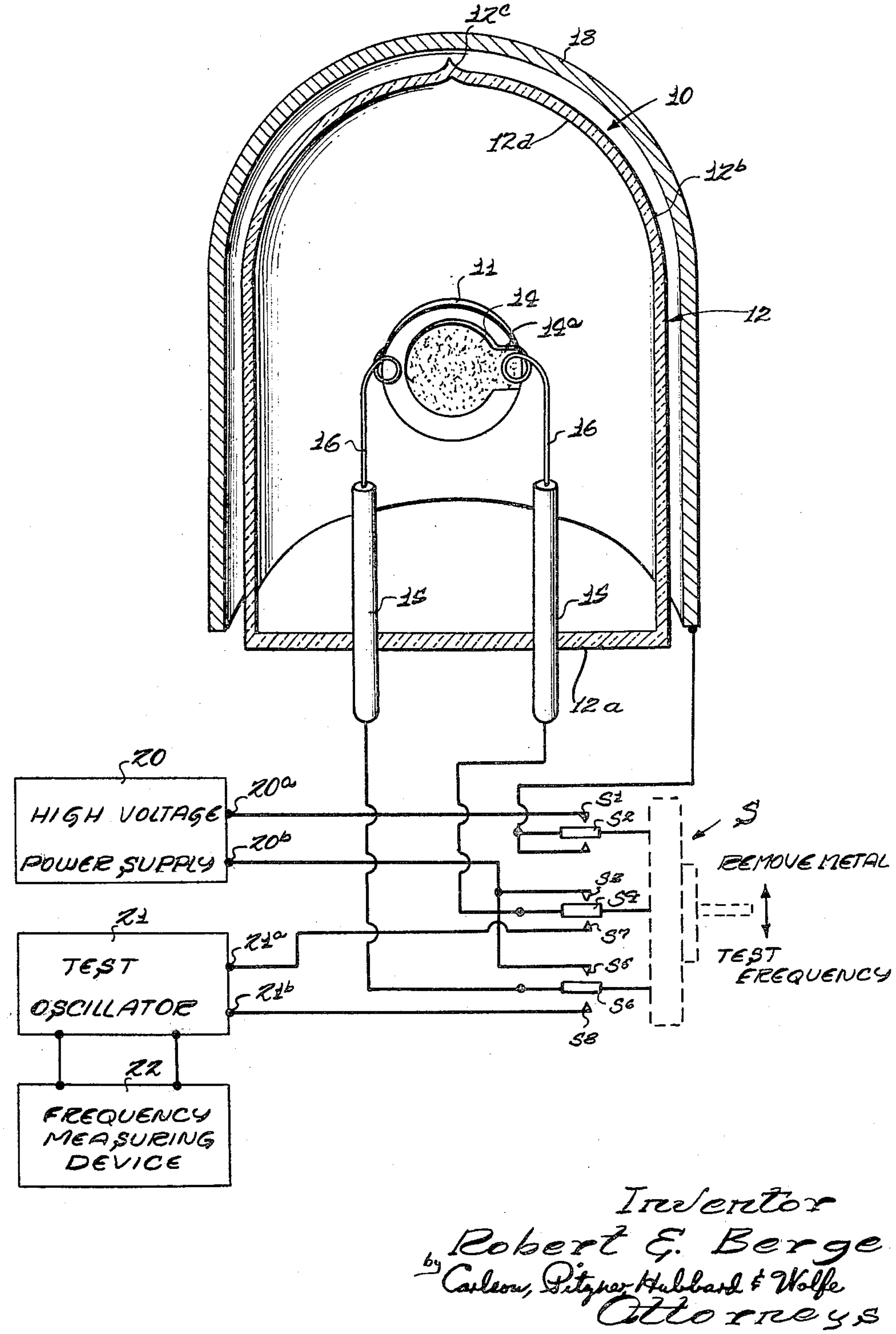
Inventor
Robert E. Berge
by Carlson, Pitzner, Hubbard & Wolfe
Attorneys United States Patent Office
2,877,338
Patented Mar. 10, 1959

2,877,338

METHOD OF ADJUSTING THE OPERATING FREQUENCY OF SEALED PIEZOELECTRIC CRYSTALS

Robert E. Berge, Sandwich, Ill., assignor to The James Knights Company, Sandwich, Ill., a corporation of Illinois Application October 22, 1954, Serial No. 464,088
5 Claims. (Cl. 219—121)

The present invention has to do with piezoelectric crystals of the type used, for example, as the frequency determining elements for precision electronic oscillators. More particularly, the invention relates to the final adjustments necessary to bring the operating frequency of such crystals to the precise value desired.

It is the general aim of the invention to provide a novel method for precisely adjusting the operating frequency of a piezoelectric crystal after the same has been sealed in an evacuated envelope.

Another and more specific object of the invention is to provide such a method in which metal may be "sputtered off" of metallic coatings on a crystal sealed in an envelope without the necessity of auxiliary electrodes and leads being placed in the envelope at the time of its manufacture. My procedure not only enables a precise increase of the crystal frequency to a desired value but permits a smaller and lighter envelope assembly.

A further object is the provision of a method for frequency adjustment of crystals which are sealed in nonconductive (e. g., glass) envelopes.

Other objects and advantages of the invention, together with a fuller understanding thereof will become apparent as the following description proceeds, taken in conjunction with the accompanying drawing in which the single figure illustrates, in partially sectioned perspective, an exemplary sealed crystal together with one form of apparatus, diagrammatically shown, for practicing the invention.

While the method of the present invention will be described with reference to the preferred manner of its practice, it is to be understood that various modifications and departures may be made from the specific procedures given without departing from the spirit and scope of the invention as defined in the appended claims.

Referring now to the drawing, a crystal assembly 10, drawn to a large scale, is there shown which is typical of those sealed crystal mounts most advantageously subjected to the method of the present invention. The assembly includes a wafer or crystal 11 mounted within an evacuated and sealed envelope 12 which in this case is made of non-conductive glass. The crystal 11 is carefully cut from suitable piezoelectric material such as natural or synthetic quartz and, for the purpose of affording electrical connection thereto, is provided with thin layers or coatings 14 of conductive metal located centrally on its opposite faces. While various metals may be used for the coatings, certain ones such as gold or silver have been found most satisfactory. It will be understood by those skilled in the art that the thickness of the coatings 14, and their resulting mechanical inertia or "loading," appreciably affect the operating frequency of the crystal 11 and, in view of this, such coatings are usually very thin and carefully applied as by evaporation processes.

In order to mount the crystal 11 within the envelope 12 and to provide external electrical connections, a pair of connectors or metal stems 15 are sealed in mutually spaced relation in the lower press portion **12*a* of the envelope. The lower ends of these stems are suited for plug-in connection to sockets used in various types of electrical equipment such as electronic oscillators. A pair of resilient wires 16 are welded to the upper ends of the respective stems 15 and formed at their upper ends to present tight spirals which may be clipped over the edges of the crystal 11 at points diametrically opposite one another. The wires 16 with their spiral clips thus afford a shock resistant mount for the crystal, and at the same time electrically connect with the latter by engaging radial extensions 14*a* of the respective coatings 14** on opposite sides of the crystal.

After the crystal is mounted on the wires 16 and the press portion **12*a* bonded to the bonnet portion 12*b* of the envelope, the interior of the latter is exhausted, for example, by the usual vacuum pump or the like through a tubulation 12*c* which is then sealed off. Such a sealed mounting for the crystal 11 renders the latter substantially immune from the effects of changing atmospheric pressure, temperature, and humidity which, as is known, may cause appreciable drifting of the operating frequency. Moreover, the sealed envelope 12** totally excludes foreign matter such as dirt and moisture which may also adversely affect the natural frequency and stability of the crystal.

The operating or natural frequency of a piezoelectric crystal depends principally upon its dimensions, the manner in which it is cut relative to its crystalline structure, and the thickness or mechanical inertia of metallic coatings applied to its surfaces for the purpose of establishing electrical connections. Since absolute control of these factors in the manufacturing processes is impossible as a practical matter, it is necessary that each completed crystal be etched or its metal coatings increased or decreased in thickness, until the desired operating frequency is obtained.

The problem is considerably complicated, however, in the case of crystals which are mounted in evacuated and sealed envelopes in order to minimize the adverse effects on frequency which foreign matter or changing pressure, humidity and temperature create under various conditions of use. The mounting of the crystal in the envelope and the subsequent evacuation and sealing of the latter almost always causes some change in the original operating frequency, so precise adjustment is necessary after the envelope seal is made. And it is important that the final adjustment be made without the requirement of extra electrodes in and leads extending through the envelope, since these would entail a considerable increase in the cost of manufacture, and unduly increase the size and weight of the envelope.

In accordance with the invention, these problems and requirements are satisfied by a convenient method of frequency adjustment which effects the removal of the necessary amount of metal from the coatings 14 by controlled electric discharge created by means entirely external of the envelope 12. By the proper application of an electric potential, the inner surface of the envelope 12 becomes a virtual anode, and the coatings 14 serve as a cathode, so that the resulting electrical discharge transfers small amounts of metal from the coatings to the envelope. By making the coatings originally heavier than necessary for the crystal frequency desired, the proper amount of metal may thus be removed after the envelope is sealed to obtain the exact frequency of operation desired.

In carrying out this method, an electrode is first placed in proximity to the external surface of the envelope 12. Such an electrode 18 is shown in the drawings as a metal cup which substantially surrounds the entire envelope. Various other forms of electrodes may be used with success, a U-shaped plate, a layer of metal foil wrapped around the envelope, a mercury bath, or a channeled-out block of metal all having proven satisfactory.

Next, a relatively high voltage is applied between the external ends of the connectors or stems 15 and the electrode 18. By capacitive coupling between the electrode 18 and the envelope 12, the inner surface 12*d* of the latter acts as a virtual anode and the metallic coatings 14 as a cathode. Preferably, at this time, the two stems 15 are electrically tied together so that there is no electrical potential created across the crystal itself and so that the electric fields between the two coatings 14 and the inner surface of the envelope are substantially alike.

While a D.-C. potential or voltage may be employed, with the electrode 18 made positive and the coatings 14 made negative, it has been found that an alternating voltage is even more satisfactory since it need not be as great to produce the same rate of metal transfer. The potential employed is made sufficiently great to cause an electric discharge between the coatings 14 and the envelope surface 12*d*, the magnitude of such voltage depending upon the degree of vacuum in the envelope, the spacing between the envelope 12 and the electrode 18, and the relative size, spacing and configuration of the interior of the envelope and the metal coatings 14. By way of example, with a crystal envelope about the size of an ordinary acorn having a pressure on the order of 100 microns, a potential difference of 25,000 volts at a frequency of 30 kc. has been found very effective to create the discharge necessary to transfer metal from the coatings 14 to the envelope surface 12*d*. It has been observed that transfer of the metal is unidirectional, apparently for the reason that the inner surface 12*d* is so large relative to the surfaces of the coatings 14 that point rectification occurs. Thus, reverse transfer of metal from the envelope back onto the coatings 14 is not experienced. It is desirable, however, that the internal envelope surface 12*d* be thoroughly cleaned of foreign matter or dirt prior to sealing of the envelope in order that the glass surface does not easily act as an emitter causing transfer of such foreign matter to the crystal itself.

It has also been discovered that, contrary to normal expectations, such electric discharge removes metal uniformly from the exposed surfaces of the coatings 14 rather than only from sharp edges or corners. While a localized or "spot" discharge may be initially created, the well known Faraday dark space very quickly forms and equalizes the electric field so that the discharge then proceeds uniformly from all parts of the coatings 14. Enhanced transfer of metal from the coatings 14 to the envelope 12 has been found to result if the grounded terminal of the voltage source is connected to the stems 15. While satisfactory "desputtering" is obtained in either case, it is believed that grounding of the stems 15 and coatings 14 results in a more uniform electric field and discharge, so that metal is removed uniformly from the coatings, rather than from the edges or corners.

An important advantage of this method of removing metal to increase the crystal frequency lies in the fact that any dirt, dust, occluded gas or other foreign matter inadvertently deposited on the crystal surfaces at the time of assembly is transferred by the discharge to the envelope to leave the crystal extremely clean.

After applying the potential between the envelope 18 and the coatings 14 for a short period of time, the crystal is immediately connected in the circuit of a suitable test oscillator as its frequency determining element. The frequency of the oscillator signal is then measured by any suitable means to determine if it agrees with the desired operating frequency of the crystal. If such frequency is still lower than that desired, the potential is reapplied for short intervals and frequency tests made between such intervals until it is found that the crystal provides precisely the frequency of operation desired.

As illustrated in the drawing, such steps may be conveniently accomplished by employing a high voltage power supply 20, a test oscillator 21, a frequency measuring device 22 (these being well known and thus shown in diagrammatic block and line form), and with a three pole double throw switch S. These components are connected in circuit with the electrode 18, and the stems 15 as shown. In order to apply the voltage of the power supply 20 between the anode 18 and the stems 15, it is only necessary to throw the switch S to its upper position so that contacts $S_1$ and $S_2$ connect the power supply terminal 20*a* to the anode 18, and the contacts $S_3$, $S_4$, and $S_5$, $S_6$ connect the stems 15 in parallel to the power supply terminal 20*b*. Discharge between the metal coatings 14 as cathodes and the inner surface 12*d* of the envelope as an anode will thus occur, carrying metal from the coatings to the envelope as long as the switch is held in its upper position. In order to terminate the discharge and test the operating frequency of the crystal 11, it is only necessary to depress the switch S to its lower position so that the contacts $S_4$, $S_7$, and $S_6$, $S_8$, respectively, connect the stem 15 to the terminals 21*a* and 21*b* of the test oscillator 21. The oscillator then operates at a frequency determined by the crystal 11, and the oscillator signal may be measured by the frequency measuring device 22. Since the metal coatings 14 are initially heavier than necessary to provide the desired operating frequency, thus causing the operating frequency initially to be lower than desired, successive movements of the switch S between its upper and lower positions may serve to progressively remove small amounts of metal from the coatings 14, the frequency being observed after each discharge on the measuring device 22 until the desired value is obtained.

It has been found that this method permits the crystal frequency to be precisely adjusted in but a few seconds; yet it requires no auxiliary electrodes or leads within the envelope itself. The rate of transfer of metal from the coatings 14 may depend upon various factors such as the amplitude and frequency of the voltage provided by the power supply 20 and upon the relative spacing between the electrode 18, the envelope 12, and the crystal 11. It has been found that the rate of metal transfer is sufficiently rapid under a wide range of these conditions to make the present method highly advantageous as a production line technique for finally adjusting the frequency of sealed piezoelectric crystals. The method particularly increases the efficiency of mass production since it permits the removal of sufficient amounts of metal, if necessary, to change the crystal frequency through a range of 1 to 1,000. For example, if the crystal initially has a frequency of ten mc., it is possible by the present discharge method to increase its frequency by ten kc.

I claim:

1. The method of increasing the operating frequency of a piezoelectric crystal having metal coatings on its opposite faces and sealed in an evacuated envelope with electrical connectors extending from said coatings through such envelope, said method comprising the steps of locating an electrode in proximity to the external surface of the envelope, and applying a voltage between said electrode and said connectors so that the internal surface of the envelope becomes a virtual anode and the metal coatings a cathode for sputtering of metal from the coatings to the envelope.

2. The method of increasing the operating frequency of a piezoelectric crystal having metal coatings on its opposite faces and sealed in an evacuated envelope with electrical connectors extending from said coatings through such envelope, said method comprising the steps of locating an electrode in proximity to the external surface of the envelope, and applying relatively high, alternating voltage between said electrode and said connectors so that the internal surface of the envelope becomes a virtual anode and the metal coatings a cathode by point rectification, for sputtering of metal from the coatings to the envelope.

3. The method of precisely increasing to a predetermined value the operating frequency of a piezoelectric crystal having metal coatings on its opposite faces and sealed in an evacuated envelope with electrical connectors extending from said coatings through such envelope, said method comprising the steps of locating an electrode in close proximity to said envelope, intermittently applying a voltage between said electrode and said connectors to constitute the internal surface of the envelope as a virtual anode and said metal coatings a cathode so that metal is transferred by electric discharge from said coatings to the envelope, and measuring the operating frequency of said crystal after each such application of voltage until precisely the desired frequency is obtained.

4. The method of increasing the operating frequency of a piezoelectric crystal having metal coatings on its surface after such crystal is sealed in an envelope, said method comprising the creation of a potential difference between the inner surface of the envelope and the metal coating of the crystal for effecting transfer of metal from the coating to the envelope through the medium of the resulting electrical discharge.

5. The method of precisely increasing to a predetermined value the operating frequency of a piezoelectric crystal having metal coatings on its opposite faces and sealed in an evacuated glass envelope with electrical connectors extending from said coatings through the envelope; said method comprising the steps of locating a metallic electrode in proximity to said envelope and substantially surrounding the same, and alternately (*a*) applying a high frequency alternating potential between said electrode and said connectors to cause said envelope to become a virtual anode and said coatings a cathode so that metal is transferred from the latter to the former by point rectification discharge, and (*b*) connecting said connectors to a test oscillator to cause the crystal to control the oscillator frequency, and measuring such frequency until the predetermined value is obtained.

References Cited in the file of this patent

UNITED STATES PATENTS

| | | |
|---|---|---|
| 1,616,010 | Ulrey | Feb. 1, 1927 |
| 2,217,448 | Muller | Oct. 8, 1940 |
| 2,479,286 | Wolfskill | Aug. 16, 1949 |
| 2,505,370 | Sykes | Apr. 25, 1950 |
| 2,677,071 | Carne | Apr. 27, 1954 |
| 2,702,274 | Law | Feb. 15, 1955 |